(12) United States Patent
Farah

(10) Patent No.: US 10,124,435 B2
(45) Date of Patent: Nov. 13, 2018

(54) AUTOMATIC CONTROL ON AUXILIARY VOLTAGE FOR ENGINE DRIVEN WELDER

(71) Applicant: LINCOLN GLOBAL, INC., City of Industry, CA (US)

(72) Inventor: Samir Farah, Broadview Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 496 days.

(21) Appl. No.: 14/621,592

(22) Filed: Feb. 13, 2015

(65) Prior Publication Data

US 2015/0239057 A1 Aug. 27, 2015

Related U.S. Application Data

(60) Provisional application No. 61/943,569, filed on Feb. 24, 2014.

(51) Int. Cl.
  *B23K 9/10* (2006.01)
(52) U.S. Cl.
  CPC .................. *B23K 9/1006* (2013.01)
(58) Field of Classification Search
  CPC .... B23K 9/095; B23K 9/0953; B23K 9/1006; B23K 9/1075
  USPC ... 219/133, 108, 130.1, 130.21, 137 PS, 134
  See application file for complete search history.

(56) References Cited

U.S. PATENT DOCUMENTS

| | | | | |
|---|---|---|---|---|
| 3,596,050 A | * | 7/1971 | Tikijian | B23K 7/102 219/124.03 |
| 4,546,230 A | | 10/1985 | Sasaki | |
| 4,870,248 A | * | 9/1989 | Gilliland | B23K 9/1087 219/130.21 |
| 4,994,646 A | * | 2/1991 | Tabata | B23K 9/092 219/130.51 |
| 5,086,205 A | * | 2/1992 | Thommes | B23K 10/00 219/121.39 |
| 5,196,668 A | * | 3/1993 | Kobayashi | B23K 11/24 219/110 |
| 5,319,533 A | * | 6/1994 | Reynolds | B23K 9/1006 219/137 PS |
| 5,355,075 A | * | 10/1994 | Wilson, III | H02J 9/066 322/25 |

(Continued)

FOREIGN PATENT DOCUMENTS

AU 582535 B2 4/1989

OTHER PUBLICATIONS

International Search Report and Opinion from PCT/IB2015/000200, dated Sep. 9, 2016, 7 pages.

*Primary Examiner* — Jimmy Chou

(57) ABSTRACT

A self-contained welding power supply capable of, upon termination of welding operation, automatically setting a control signal for auxiliary power is provided. The power supply comprises an engine, a generator driven by the engine, and an excitation system that controls power output of the generator. The excitation system includes an output controller and a DC controller. The output controller includes circuitry that generates a field voltage control signal to be sent to the DC controller to regulate DC power going to field windings of the generator. Upon termination of the welding operation, the field voltage control signal is automatically set to a value appropriate for the auxiliary system operation.

18 Claims, 2 Drawing Sheets

(56) References Cited

U.S. PATENT DOCUMENTS

| | | | | |
|---|---|---|---|---|
| 5,408,067 A * | 4/1995 | Crouse | B23K 9/1043 | 219/130.21 |
| 5,444,214 A * | 8/1995 | Crouse | B23K 9/1006 | 219/133 |
| 5,570,254 A * | 10/1996 | Spilger | B23K 11/25 | 219/130.32 |
| 5,601,741 A * | 2/1997 | Thommes | B23H 7/08 | 219/130.21 |
| 5,637,246 A * | 6/1997 | Ikegami | B23K 9/10 | 219/130.33 |
| 5,670,070 A * | 9/1997 | Clark | B23K 9/0953 | 219/130.33 |
| 5,824,990 A * | 10/1998 | Geissler | B23K 9/10 | 219/130.21 |
| 5,968,385 A * | 10/1999 | Beeson | B23K 9/1006 | 219/130.21 |
| 6,034,350 A * | 3/2000 | Heraly | B23K 9/1056 | 219/130.31 |
| 6,037,571 A * | 3/2000 | Christopher | A47J 37/0709 | 219/450.1 |
| 6,054,674 A * | 4/2000 | Moriguchi | B23K 9/1043 | 219/130.21 |
| 6,075,224 A * | 6/2000 | De Coster | B23K 9/0673 | 219/130.4 |
| 6,114,657 A * | 9/2000 | Hayes | B23K 9/124 | 219/132 |
| 6,115,273 A * | 9/2000 | Geissler | B23K 9/1056 | 363/89 |
| 6,121,691 A * | 9/2000 | Renner | B23K 9/1006 | 219/133 |
| 6,127,650 A * | 10/2000 | Naruto | B23K 9/1043 | 219/130.1 |
| 6,310,321 B1 * | 10/2001 | Beeson | B23K 9/1006 | 219/130.21 |
| 6,329,636 B1 * | 12/2001 | Geissler | B23K 9/1006 | 219/130.1 |
| 6,348,671 B1 * | 2/2002 | Fosbinder | B23K 9/1056 | 219/133 |
| 6,504,132 B1 * | 1/2003 | Church | B23K 9/091 | 219/130.1 |
| 6,531,685 B2 * | 3/2003 | Smith | B23K 9/1043 | 219/133 |
| 6,603,097 B2 * | 8/2003 | Leisner | B23K 9/1006 | 219/133 |
| 7,297,899 B2 * | 11/2007 | Fosbinder | B23K 9/0953 | 219/130.21 |
| 7,858,904 B2 * | 12/2010 | Fosbinder | B23K 9/1006 | 219/130.1 |
| 8,125,094 B2 * | 2/2012 | Radtke | B23K 9/10 | 290/40 B |
| 8,203,069 B2 * | 6/2012 | Gilmore | H01L 31/02021 | 136/244 |
| 8,261,717 B2 * | 9/2012 | Peotter | B66C 23/42 | 123/2 |
| 8,859,937 B2 * | 10/2014 | DuVal | B23K 9/1006 | 219/133 |
| 2002/0144989 A1 * | 10/2002 | Sammons | B23K 9/1062 | 219/137 PS |
| 2002/0190044 A1 * | 12/2002 | Leisner | B23K 9/1006 | 219/133 |
| 2003/0052108 A1 * | 3/2003 | Rappl | B23K 9/1062 | 219/130.5 |
| 2003/0052109 A1 * | 3/2003 | Hayes | B23K 9/0953 | 219/130.5 |
| 2003/0062351 A1 * | 4/2003 | Davidson | B23K 9/1006 | 219/130.5 |
| 2003/0178398 A1 * | 9/2003 | Nagatoshi | B23K 26/04 | 219/121.77 |
| 2004/0226930 A1 | 11/2004 | Radtke | | |
| 2004/0245232 A1 * | 12/2004 | Ihde | B23K 9/173 | 219/137.71 |
| 2005/0012505 A1 * | 1/2005 | Wilson | G01R 31/3278 | 324/418 |
| 2005/0250375 A1 * | 11/2005 | Allison | H01R 29/00 | 439/502 |
| 2005/0263513 A1 * | 12/2005 | Leisner | B23K 9/1006 | 219/133 |
| 2005/0263514 A1 * | 12/2005 | Albrecht | B23K 9/1006 | 219/133 |
| 2006/0138113 A1 * | 6/2006 | Ott | B23K 9/1087 | 219/132 |
| 2006/0175313 A1 * | 8/2006 | Kooken | B23K 9/09 | 219/130.1 |
| 2006/0213890 A1 * | 9/2006 | Kooken | B23K 9/095 | 219/130.21 |
| 2007/0051712 A1 * | 3/2007 | Kooken | B23K 9/095 | 219/130.1 |
| 2007/0181547 A1 * | 8/2007 | Vogel | B23K 9/1081 | 219/130.1 |
| 2008/0006612 A1 * | 1/2008 | Peters | B23K 9/04 | 219/76.14 |
| 2008/0073330 A1 * | 3/2008 | Diedrick | B23K 9/1006 | 219/133 |
| 2008/0083705 A1 * | 4/2008 | Peters | B23K 9/1068 | 219/61 |
| 2008/0264915 A1 * | 10/2008 | Manthe | B23K 9/0673 | 219/130.31 |
| 2008/0308541 A1 * | 12/2008 | Hiroi | B23K 9/1043 | 219/134 |
| 2009/0071949 A1 * | 3/2009 | Harris | B23K 9/1062 | 219/130.1 |
| 2010/0193489 A1 * | 8/2010 | Beeson | B23K 9/1056 | 219/133 |
| 2010/0320183 A1 * | 12/2010 | Borchert | B23K 9/1006 | 219/130.1 |
| 2011/0000900 A1 * | 1/2011 | Luo | B23K 9/1043 | 219/130.1 |
| 2011/0006046 A1 * | 1/2011 | Albrecht | B23K 9/1006 | 219/133 |
| 2011/0073569 A1 * | 3/2011 | Rappl | B23K 9/095 | 219/73.2 |
| 2011/0114607 A1 * | 5/2011 | Albrecht | B23K 9/1006 | 219/108 |
| 2011/0284527 A1 * | 11/2011 | Holverson | B23K 9/1006 | 219/660 |
| 2011/0309054 A1 * | 12/2011 | Salsich | B23K 9/09 | 219/108 |
| 2011/0309055 A1 * | 12/2011 | Rozmarynowski | B23K 9/1006 | 219/108 |
| 2012/0097644 A1 * | 4/2012 | Ott | B23K 9/095 | 219/108 |
| 2012/0097655 A1 * | 4/2012 | Daniel | B23K 9/091 | 219/130.21 |
| 2012/0097656 A1 * | 4/2012 | Peters | B23K 9/091 | 219/130.51 |
| 2012/0111842 A1 * | 5/2012 | Fujiwara | B23K 9/09 | 219/130.33 |
| 2012/0118865 A1 * | 5/2012 | Stava | B23K 9/1006 | 219/130.31 |
| 2012/0138582 A1 * | 6/2012 | Radtke | B23K 9/10 | 219/121.27 |
| 2012/0138587 A1 * | 6/2012 | Fosbinder | B23K 9/1006 | 219/133 |
| 2013/0068744 A1 * | 3/2013 | Matsui | B23K 9/092 | 219/137 R |
| 2013/0327753 A1 * | 12/2013 | Roth | B23K 9/124 | 219/137.71 |
| 2013/0327754 A1 * | 12/2013 | Salsich | B23K 9/124 | 219/137.71 |
| 2014/0131320 A1 * | 5/2014 | Hearn | B23K 9/092 | 219/74 |
| 2014/0131329 A1 * | 5/2014 | Meckler | B23K 9/095 | 219/130.1 |

(56) References Cited

U.S. PATENT DOCUMENTS

| | | | | |
|---|---|---|---|---|
| 2014/0263245 A1* | 9/2014 | Ulrich | ............ | B23K 9/1075 |
| | | | | 219/133 |
| 2014/0374398 A1* | 12/2014 | Manthe | ............ | B23K 9/1043 |
| | | | | 219/130.21 |
| 2016/0183330 A1* | 6/2016 | Sigl | ............ | H05B 6/365 |
| | | | | 219/672 |

* cited by examiner

AUTOMATIC CONTROL ON AUXILIARY VOLTAGE FOR ENGINE DRIVEN WELDER

PRIORITY

The present application claims priority to U.S. Provisional Patent Application No. 61/943,569, which is incorporated herein by reference in its entirety.

BRIEF SUMMARY OF THE INVENTION

FIELD OF THE INVENTION

This invention relates in general to equipment used in welding. Devices, systems, and methods consistent with the invention relate to the auxiliary power system in engine-driven welders.

DESCRIPTION OF THE RELATED ART

Welding is an important process in the manufacture and construction of various products and structures. Applications for welding are widespread and used throughout the world, for example, the construction and repair of ships, buildings, bridges, vehicles, and pipe lines, to name a few. Welding may performed in a variety of locations, such as in a factory with a fixed welding operation or on site with a portable welder. For example, welding operations often take place on construction sites, and remote sites, and in other locations where a self-contained power supply is advantageous.

Self-contained gasoline or diesel fuel welding power supplies are popular products. Such products generally comprise a gasoline or diesel engine that drives an electrical generator having an electrical output, which is used to create an arc and weld metal. Single and three-phase alternating current generators are often used. As these power supplies are used in remote locations, it is often beneficial to have power available for other devices such as lights, appliances, and power tools. Thus, along with providing the welding power output, some related-art self-contained power supplies also provide auxiliary power to power common electrical devices. For example, welders will typically alternate between welding and grinding during the course of a job. Accordingly, a self-contained power supply that supplies both welding power and auxiliary power to auxiliary power receptacles at, e.g., 120 or 240 volts A.C. is beneficial.

In the related-art systems, the welding voltage and current from the generator is regulated by the amount of field excitation provided to the generator rotor. Because the same generator supplies both welding power and auxiliary power, the excitation controller will also affect the voltage at the auxiliary power receptacles. During many welding operations, full excitation is not needed and thus the excitation controls will be set to less than 100%. However, when welding operations cease and auxiliary power is utilized, e.g., for grinding, the excitation controller must be set to 100% again in order to ensure that full voltage is available to the auxiliary devices such as, e.g., power tools. Repeatedly adjusting the excitation controller when switching between welding operations and utilizing auxiliary power creates a nuisance and the potential for improper welding operations.

BRIEF SUMMARY OF THE INVENTION

This invention relates to a system or method that is capable of automatically setting a permissible power setting on the auxiliary power output(s) of a welding power supply. For example, the maximum safe power setting on the auxiliary power outlets of an engine-driven welder can be automatically be set when welding operations cease.

Various aspects will become apparent to those skilled in the art from the following detailed description and the accompanying drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
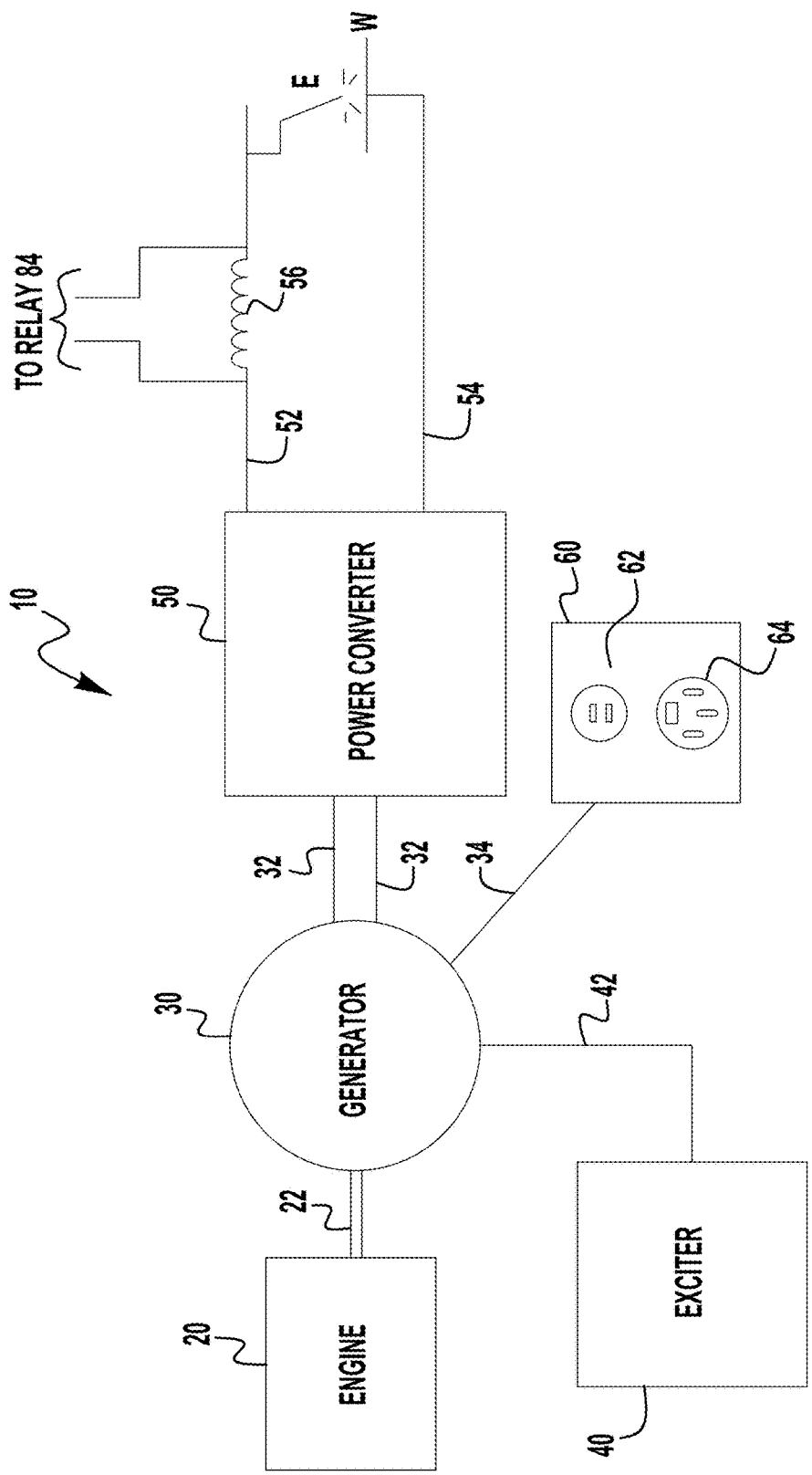
FIG. 1 is a block diagram of a welding system according to the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Referring now to the drawings, there is illustrated in FIG. 1 a self-contained welding power supply 10. The welding power supply 10 contains an engine 20, which can be, e.g., a gasoline engine, diesel engine or some other type of engine, e.g., natural gas/propane. The engine 20 is physically connected to generator 30 via shaft 22. The generator 30 can be, e.g., a single-phase or three-phase generator. The generator 30 provides power for welding operations through leads 32 to power converter 50. The power converter 50 receives the AC power from the generator 30 and converts it to the welding voltage and current required by the system. The welding current is sent to the electrode E and workpiece W via leads 52 and 54. The output of the power converter 50 can include an output reactor 56. The topology of the power converter is not limiting and can range from simple diode bridges to inverter-based systems. The various topologies of welding power supplies are well-known and will not be further discussed except as needed to describe various embodiments of the present invention.

The generator 30 also provides auxiliary power to auxiliary power box 60 via line 34. The auxiliary power box 60 includes auxiliary receptacles 62 and 64 that can be used by power tools, appliances, lighting, etc. As such, the generator 30 is configured to provide the appropriate auxiliary voltage such as e.g., 120 volts A.C. and 240 volts A.C. The receptacles 62 and 64 can be standard receptacles that accept standard power plugs, e.g., 120 and 240 volt A.C. power plugs or can be configured as desired.

The output of the generator 30 is controlled by the excitation system 40. The excitation system 40 receives an input signal via line 41 and provides DC power via lead 42 to the generator 30 field windings (not shown) to control the output voltage and current of the generator 30. The excitation system 40 can be, e.g., a static excitation system in which power is provided by the generator 30 via a stationary device such as a transformer. Of course, the type of excitation system is not limiting and other types of excitation systems can be used as desired, e.g., DC or AC rotating systems in which the excitation power is provided by a small DC or AC generator that is coupled to the same shaft as the generator 30, or some other power source.

Figure 2:
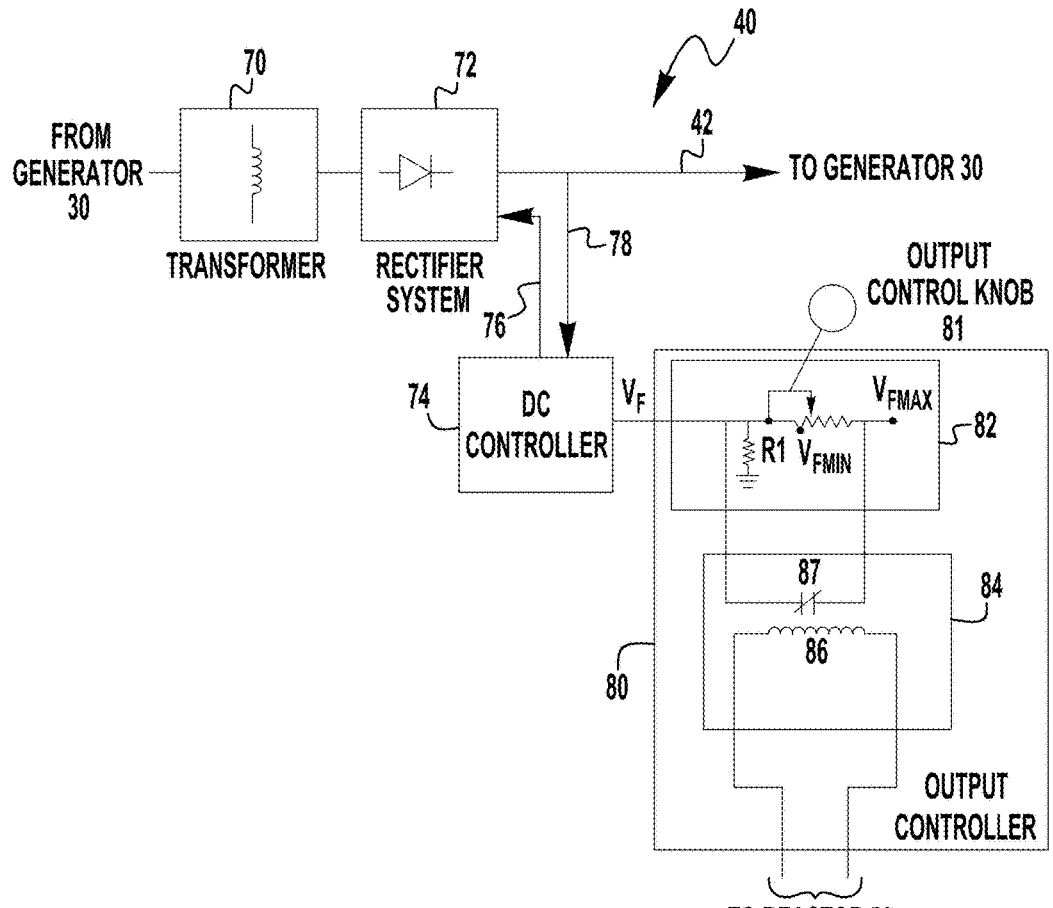
FIG. 2 is a block diagram of an exemplary embodiment of the exciter in FIGS. 1.

An exemplary embodiment of an excitation system is illustrated in FIG. 2. As seen in FIG. 2, the excitation system 40 includes an excitation source 70, which can be a transformer that is connected to the output of generator 30. In some embodiments, the excitation source 70 can be integral to generator 30. The excitation source 70 provides an AC signal that is sent to rectifier system 72. Rectifier system 72 converts the AC signal from excitation source 70 to a DC signal that is sent to the generator field. The rectifier system 72 can include, e.g., silicon-controlled rectifiers, thyristors, or other appropriate devices that can be controlled so as to regulate the DC power going to the field of generator 30. By regulating the DC power going to the generator field(s), the welding power and current can be regulated as desired.

As illustrated in FIG. 2, DC controller 74 sends a control signal via line 76 to rectifier system 72 to appropriately control the rectifier system 72 to maintain the desired DC field voltage at the output of the rectifier system 72. A DC field voltage feedback signal representing the output of the rectifier system 72 can be sent to the DC controller 74 via line 78. The DC controller 74 receives the desired DC field voltage setpoint from output controller 80. The DC controller 74 includes the appropriate controls to compare the DC field voltage feedback signal to the desired DC field voltage setpoint and make the appropriate adjustments to the control signal to rectifier system 72.

In some embodiments of the present invention, the output controller 80 includes a field voltage input device 82 that can output a desired field voltage control signal $V_f$ to DC controller 74. In some embodiments, the field voltage input device 82 can be manually set by the welder as desired. For example, in some embodiments as illustrated in FIG. 2, the field voltage input device 82 can be a potentiometer that the welder adjusts using an output control knob 81 that is located on, e.g., the welder 10. Based on the position of the potentiometer, the desired field voltage control signal Vf can range from $V_{fmin}$ and $V_{fmax}$. $V_{fmin}$, based on the value of R1, can represent the minimum DC field voltage that can be applied to the generator fields, e.g., based on the generator ratings or some other design criteria. $V_{fmax}$ can represent the maximum DC field voltage that can be applied to the generator, e.g., based on the generator ratings or some other design criteria.

During welding operations, the welder can set the field voltage control signal Vf to achieve the desired welding voltage and current. The desired DC field voltage signal $V_f$ is then sent to the DC controller 74, which compares the setpoint signal $V_f$ to the DC field voltage feedback signal on line 78. The DC controller 74 will appropriately control the rectifier system 72 so that the desired DC field voltage is sent to the generator field and thus the desired generator welding voltage and current is output for welding operations at electrode E.

However, when welding operations are stopped, the auxiliary receptacles 62, 64, may not be at the proper voltage because adjusting the field voltage input device 82 during welding operations will also affect the voltage at auxiliary receptacles 61, 64, unless the DC field voltage signal $V_f$ is set back to the proper value for the auxiliary system devices (e.g., back to 100% excitation or some other appropriate value). Thus, in embodiments of the present invention, the DC field voltage signal $V_f$ is automatically set back to a value that is appropriate for auxiliary power operation after welding operations have stopped. For example, in some embodiments, relay 84 with coil 86 and contact 88 can automatically set the DC field voltage signal $V_f$ back to the proper value for the auxiliary system devices after welding operations have stopped.

For example, coil 86 of relay 84 can be connected across the output reactor 56 as shown in FIGS. 1 and 2. When welding operations are being performed, current will flow through the output reactor 56, and the voltage across the output reactor 56 will build up. When the voltage reaches an upper threshold level, the coil 86 will energize and the normally closed contact 88 will open thereby allowing field voltage input device 82 to function as described above. However, when welding operations are stopped and power converter 50 is turned off, the current through the output reactor 56 will go to zero and the voltage across the reactor 56 with drop to zero. When the voltage drops to a lower threshold level, the coil 86 will de-energize and the normally closed contacts will close and bypass, i.e., short circuit, the field voltage input device 82. Thus, the voltage corresponding to $V_{fmax}$ will be sent as the DC field voltage signal $V_f$ to DC controller 74. Of course, the upper threshold level and the lower threshold levels are set so that welding operations are not adversely affected. That is, when welding operations start, the upper threshold level will be set such that the relay 84 will almost immediate pick up to allow the field voltage input device 82 to be active. The lower threshold is set such that normal voltage fluctuations during the welding process will not inadvertently de-energize relay 84.

Of course, other configurations can be used to energize and de-energize relay 84. For example, the relay 84 control can be based on whether a trigger on the welding torch is depressed. That is, the relay 84 will energize whenever the welder presses the trigger on the welding torch to initiate welding operating, and relay 84 will de-energize whenever the welder releases the trigger to stop welding operations.

Figure 3:
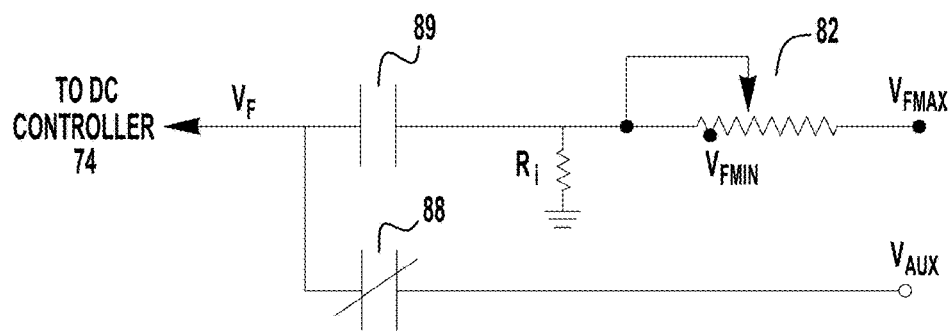
FIG. 3 is a schematic diagram of an embodiment consistent with the present invention to set the field voltage input signal.

In some embodiments, a voltage other than $V_{fmax}$ is sent to the DC controller 74 when welding operations have stopped. For example, in FIG. 3, one end of the normally closed contact 88 is connected to a predetermined voltage $V_{aux}$ and a normally open contact 89 is placed in series with field voltage input device 82. When welding operations have stopped, $V_{aux}$ is sent as the field voltage input signal $V_f$ to DC controller 74. When welding operations begin, the normally closed contacts 88 open and normally open contacts 89 close to activate field voltage input device 82. $V_{aux}$ can be greater or less than $V_{fmax}$, depending on the needs of the system.

In some embodiments of the invention, contacts on the relay 84 can send a welding operations status signal directly to the DC controller 74. In this embodiment, when welding operations are stopped, the DC controller will ignore field voltage input signal $V_f$ and output a predetermined voltage signal that corresponds to the desired auxiliary voltage. The predetermined voltage signal can be based on a value stored in memory.

It should be noted that exemplary embodiments of the present invention can be used in either 50 or 60 Hz systems.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the above embodiments.

What is claimed is:

1. A self-contained welding power supply, the self-contained welding power supply supply comprising:
   a prime mover;
   a generator driven by the prime mover to produce power for welding power and for auxiliary system operation; and
   an excitation system that controls power output of the generator by regulating DC power going to field windings of the generator, the excitation system including
      a DC controller that receives a field voltage control signal, compares the field voltage control signal with a DC field voltage feedback signal, and regulates the DC power going to the field windings of the generator based on the comparison; and
      an output controller that generates the field voltage control signal, the output controller including
         a field voltage input device, and
         a field voltage reset circuit,
   wherein, when a welding operation is in progress, the field voltage input device is enabled such that a field voltage control signal value is settable to a desired value for the welding operation, and
   wherein, when no welding operation is in progress, the field voltage reset circuit is enabled such that the field voltage control signal value is set to a predetermined value appropriate for the auxiliary system operation.

2. The self-contained welding power supply of claim 1, further comprising an output reactor,
   wherein a determination of whether the welding operation is in progress is based on a current flow through the output reactor.

3. The self-contained welding power supply of claim 2, wherein the field voltage reset circuit includes a relay having at least one contact and at least one coil,
   wherein the relay operates between a first state and a second state based on whether the current is flowing through the output reactor, and
   wherein the first state of the relay permits the setting the field voltage control signal value to the desired value for the welding operation and the second state of the relay sets the field voltage control signal value to the predetermined value appropriate for the auxiliary system operation.

4. The self-contained welding power supply of claim 3, wherein the at least one coil of the relay is connected across the output reactor.

5. The self-contained welding power supply of claim 1, wherein the field voltage control signal is manually set by a welding operator.

6. The self-contained welding power supply of claim 1, wherein the self-contained welding power supply further comprises an auxiliary power box that receives auxiliary power from the generator.

7. The self-contained welding power supply of claim 6, wherein the auxiliary power box includes one or more receptacles that receive at least one of a 120 volts AC plug and a 240 volts AC plug.

8. The self-contained welding power supply of claim 1, wherein the prime mover is a gasoline engine or a diesel engine.

9. The self-contained welding power supply of claim 1, wherein the generator is a single-phase generator or a three-phase generator.

10. The self-contained welding power supply of claim 1, further comprising a torch having a trigger,
    wherein a determination of whether the welding operation is in progress is based on operation of the trigger.

11. The self-contained welding power supply of claim 10, wherein the field voltage reset circuit includes a relay having at least one contact and at least one coil,
    wherein the relay operates between a first state and a second state based on whether the trigger is pressed, and
    wherein the first state of the relay permits the setting of the field voltage control signal value to the desired value for the welding operation and the second state of the relay sets the field voltage control signal value to the predetermined value appropriate for the auxiliary system operation.

12. The self-contained welding power supply of claim 4, wherein the relay has an upper threshold voltage level and is energized when a voltage across the output reactor becomes equal to or higher than the upper threshold voltage level.

13. The self-contained welding power supply of claim 12, wherein the upper threshold voltage level is set such that when welding operation starts, the relay is energized substantially immediately.

14. The self-contained welding power supply of claim 4, wherein the relay has a lower threshold voltage level and the relay is de-energized when a voltage across the output reactor becomes equal to or lower than the lower threshold voltage level.

15. The self-contained welding power supply of claim 14, wherein the lower threshold voltage level is set such that the relay is prevented from being de-energized due to normal voltage fluctuations during the welding operation.

16. The self-contained welding power supply of claim 4, wherein upon termination of the welding operation, a current through the output reactor becomes zero.

17. The self-contained welding power supply of claim 1, wherein the output controller includes a potentiometer.

18. The self-contained welding power supply of claim 17, wherein the potentiometer has an adjustable knob by which a desired field voltage control signal is set by a welding operator.

* * * * *